US010631261B2

(12) United States Patent
Liu et al.

(10) Patent No.: US 10,631,261 B2
(45) Date of Patent: Apr. 21, 2020

(54) LEGACY COMPATIBLE PRIMARY SYNCHRONIZATION SIGNAL / SECONDARY SYNCHRONIZATION SIGNAL DESIGN FOR COVERAGE EXTENDED AND COST-REDUCED USER EQUIPMENT

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/148,638

(22) Filed: Oct. 1, 2018

(65) Prior Publication Data

US 2019/0124613 A1 Apr. 25, 2019

Related U.S. Application Data

(60) Provisional application No. 62/574,646, filed on Oct. 19, 2017.

(51) Int. Cl.
*H04L 5/00* (2006.01)
*H04W 56/00* (2009.01)
(Continued)

(52) U.S. Cl.
CPC ....... *H04W 56/0015* (2013.01); *H04L 5/0053* (2013.01); *H04L 27/2613* (2013.01); *H04W 56/00* (2013.01); *H04W 72/1263* (2013.01)

(58) Field of Classification Search
CPC ............. H04W 56/0015; H04W 56/00; H04W 72/1263; H04L 5/0053; H04L 27/2613
See application file for complete search history.

(56) References Cited

U.S. PATENT DOCUMENTS

2016/0316444 A1\* 10/2016 Ringh ............... H04W 56/0015

FOREIGN PATENT DOCUMENTS

| WO | 2017018966 A1 | 2/2017 |
| WO | 2017027822 A1 | 2/2017 |
| WO | 2018208435 A1 | 11/2018 |

OTHER PUBLICATIONS

Intel Corporation: "System Acquisition Time Reduction for efeMTC", 3GPP Draft; R1-1717339, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20171009-20171013 Oct. 8, 2017, XP051340529, Retrieved from the Internet: URL:http://www.3gpp.org/ftp/Meetings_3GPP_SYNC/RAN1/Docs/ [retrieved on Oct. 8, 2017], 6 pages.
(Continued)

*Primary Examiner* — Melvin C Marcelo
(74) *Attorney, Agent, or Firm* — Nerrie M. Zohn

(57) ABSTRACT

A method, an apparatus, and a computer program product for wireless communication are provided. The apparatus may receive a primary synchronization signal (PSS) and a secondary synchronization signal (SSS) in a first set of symbols of a first subframe of a frame. Within the first set of symbols of the first subframe, the SSS is prior to the PSS. The apparatus may also receive the PSS and the SSS in a first set of symbols of a second subframe of the frame and a second set of symbols of the second subframe of the frame. Within each of the first and second sets of symbols of the second subframe, the SSS is subsequent to the PSS. The apparatus may synchronize with a base station based at least in part on the PSS and the SSS.

30 Claims, 15 Drawing Sheets

(51) Int. Cl.
*H04L 27/26* (2006.01)
*H04W 72/12* (2009.01)

(56) References Cited

OTHER PUBLICATIONS

International Search Report and Written Opinion—PCT/US2018/053981—ISA/EPO—dated Jan. 14, 2019 (180403WO).

* cited by examiner

US 10,631,261 B2

LEGACY COMPATIBLE PRIMARY SYNCHRONIZATION SIGNAL / SECONDARY SYNCHRONIZATION SIGNAL DESIGN FOR COVERAGE EXTENDED AND COST-REDUCED USER EQUIPMENT

CROSS REFERENCE TO RELATED APPLICATIONS UNDER 35 U.S.C § 119

This application claims priority to U.S. Provisional Patent Application No. 62/574,646, filed on Oct. 19, 2017, entitled "TECHNIQUES AND APPARATUSES FOR A LEGACY COMPATIBLE PRIMARY SYNCHRONIZATION SIGNAL/SECONDARY SYNCHRONIZATION SIGNAL DESIGN FOR COVERAGE EXTENDED AND COST-REDUCED USER EQUIPMENT," which is incorporated by reference herein.

BACKGROUND

Field

Aspects of the present disclosure generally relate to wireless communication, and more particularly to techniques and apparatuses for a legacy compatible primary synchronization signal (PSS)/secondary synchronization signal (SSS) design for coverage extended (CE) and cost-reduced user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

At times, a UE may need to perform an initial access (or initial acquisition) procedure to gain access to a wireless network. As part of the initial access procedure, the UE may need to search for a synchronization channel transmitted by a network access device, such as a base station, of the wireless network. In some cases, the UE may need to receive multiple repetitions of the synchronization channel (e.g., a PSS and/or an SSS) in order to perform the initial access procedure. For example, a CE and/or cost-reduced UE may need to receive multiple repetitions of the synchronization channel in order to perform the initial access procedure, while a legacy UE (e.g., a Long Term Evolution (LTE) UE, a MuLTEfire (MF) UE, and/or the like) may need to receive a single instance of the synchronization channel (e.g., as defined in a legacy PSS/SSS configuration) in order to perform the initial access procedure. However, in a case where the CE and/or cost-reduced UEs coexist with legacy UEs, the repetitions of the synchronization channel (needed by the CE and/or the cost-reduced UEs) should not interfere with operation of the legacy UEs. After performing the initial access procedure, a given UE (e.g., a CE and/or cost-reduced UE, a LTE UE, a MF UE, and/or the like) also may acquire various items of system information, such as information contained in a master information block (MIB) or one or more system information blocks (e.g., SIB1, SIB2, etc.) that may be transmitted in a physical broadcast channel (PBCH) transmission from a base station.

SUMMARY

The described techniques relate to improved methods, systems, devices, or apparatuses that support a legacy compatible PSS/SSS design for CE and cost-reduced UEs. As described above, in some cases, a CE and/or cost-reduced UE may coexist with a legacy UE (e.g., the CE and/or cost-reduced UE may use a same frequency band as the legacy UE). However, since the CE and/or cost-reduced UE may need to receive multiple instances of a PSS and/or a SSS associated with performing an initial access procedure, repetitions of the PSS/SSS are needed, and these repetitions should not interfere with operation of the legacy UEs configured to search for a single instance of the PSS/SSS (e.g., in a first subframe of a frame).

One technique to address this issue is to introduce new (i.e., different) PSS/SSS sequences for use by the CE and/or cost-reduced UEs. In such a case, legacy UEs would not latch on to the new PSS/SSS repetitions and, thus, would be capable of performing initial access using the (legacy) PSS/SSS. However, introduction of new PSS/SSS sequences may cause a number of cross correlations, performed by the CE and/or cost-reduced UEs in association with receiving the PSS/SSS, to be increased (e.g., since a given CE and/or cost-reduced UE would need to perform cross correlation with the legacy PSS/SSS sequences for all timing hypotheses, as well as with the new PSS/SSS sequences for all timing hypotheses), thereby increasing (e.g., doubling) complexity at the CE and/or cost-reduced UE. Since CE and/or cost-reduced UEs are designed to be low cost (e.g., as compared to a legacy LTE UE or a MF UE), the number of cross correlations should be minimized, thereby rendering inclusion of new PSS/SSS sequences an undesirable solution.

Generally, aspects described herein provide techniques and apparatuses for a legacy compatible PSS/SSS design for CE and cost-reduced UEs. In some aspects, the legacy compatible PSS/SS design for CE and cost-reduced UEs includes repetition of the PSS/SSS sequence in multiple subframes of a frame (e.g., within discovery reference signal (DRS) measurement timing configuration (DMTC) windows in each of the multiple subframes) where, in each repetition of the PSS/SSS sequence, the location of the PSS is swapped with the location of the SSS as compared to a legacy design.

For example, in the legacy design, PSS/SSS is included in a first subframe of a frame, and the SSS is one symbol before the PSS. According to the legacy compatible PSS/SSS design for CE and/or cost-reduced UEs, described herein, the PSS/SSS (i.e., the same sequences) may be included in multiple subframes of the frame (e.g., the first subframe, a second subframe of the frame, an $M^{th}$ subframe of the frame), and the SSS is after the PSS (e.g., rather than before the PSS). This "swapping" of the PSS and SSS prevents operation of legacy UEs from being impacted (e.g., the swapped PSS/SSS would fail SSS detection at the legacy UEs and would be ignored), while allowing CE and/or cost-reduced UEs to coexist with the legacy UEs in the same frequency band.

In an aspect of the disclosure, a method, a user equipment, a base station, an apparatus, and a computer program product are provided.

In some aspects, the method may include receiving, by a UE, a PSS and a SSS in a first set of symbols of a first subframe of a frame, wherein, within the first set of symbols of the first subframe, the SSS is received in a symbol that is prior to a symbol of the first subframe in which the PSS is received; receiving, by the UE, the PSS and the SSS in a first set of symbols of a second subframe of the frame and in a second set of symbols of the second subframe, wherein, within the first set of symbols of the second subframe and within the second set of symbols of the second subframe, the SSS is received in a symbol that is subsequent to a symbol in which the PSS is received; and synchronizing, by the UE, with a base station based at least in part on the PSS and the SSS.

In some aspects, the apparatus may include a memory and at least one processor coupled to the memory. The at least one processor may be configured to receive a PSS and a SSS in a first set of symbols of a first subframe of a frame, wherein, within the first set of symbols of the first subframe, the SSS is received in a symbol that is prior to a symbol of the first subframe in which the PSS is received; receive the PSS and the SSS in a first set of symbols of a second subframe of the frame and in a second set of symbols of the second subframe, wherein, within the first set of symbols of the second subframe and within the second set of symbols of the second subframe, the SSS is received in a symbol that is subsequent to a symbol in which the PSS is received; and synchronize with a base station based at least in part on the PSS and the SSS.

In some aspects, the apparatus may include means for receiving a PSS and a SSS in a first set of symbols of a first subframe of a frame, wherein, within the first set of symbols of the first subframe, the SSS is received in a symbol that is prior to a symbol of the first subframe in which the PSS is received; means for receiving the PSS and the SSS in a first set of symbols of a second subframe of the frame and in a second set of symbols of the second subframe, wherein, within the first set of symbols of the second subframe and within the second set of symbols of the second subframe, the SSS is received in a symbol that is subsequent to a symbol in which the PSS is received; and means for synchronizing with a base station based at least in part on the PSS and the SSS.

In some aspects, a non-transitory computer-readable medium may store one or more instructions for wireless communication. The one or more instructions, when executed by one or more processors, may cause the one or more processors to receive a PSS and a SSS in a first set of symbols of a first subframe of a frame, wherein, within the first set of symbols of the first subframe, the SSS is received in a symbol that is prior to a symbol of the first subframe in which the PSS is received; receive the PSS and the SSS in a first set of symbols of a second subframe of the frame and in a second set of symbols of the second subframe, wherein, within the first set of symbols of the second subframe and within the second set of symbols of the second subframe, the SSS is received in a symbol that is subsequent to a symbol in which the PSS is received; and synchronize with a base station based at least in part on the PSS and the SSS.

In some aspects, the method may include transmitting, by a base station, a PSS and a SSS in a first set of symbols of a first subframe of a frame, wherein, within the first set of symbols of the first subframe, the SSS is transmitted in a symbol that is prior to a symbol of the first subframe in which the PSS is transmitted; and transmitting, by the base station, the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted.

In some aspects, the apparatus may include a memory and at least one processor coupled to the memory. The at least one processor may be configured to transmit a PSS and a SSS in a first set of symbols of a first subframe of a frame, wherein, within the first set of symbols of the first subframe, the SSS is transmitted in a symbol that is prior to a symbol of the first subframe in which the PSS is transmitted; and transmit the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted.

In some aspects, the apparatus may include means for transmitting a PSS and a SSS in a first set of symbols of a first subframe of a frame, wherein, within the first set of symbols of the first subframe, the SSS is transmitted in a symbol that is prior to a symbol of the first subframe in which the PSS is transmitted; and means for transmitting the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted.

In some aspects, a non-transitory computer-readable medium may store one or more instructions for wireless communication. The one or more instructions, when executed by one or more processors, may cause the one or more processors to transmit a PSS and a SSS in a first set of symbols of a first subframe of a frame, wherein, within the first set of symbols of the first subframe, the SSS is transmitted in a symbol that is prior to a symbol of the first subframe in which the PSS is transmitted; and transmit the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted.

Aspects generally include a method, apparatus, system, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
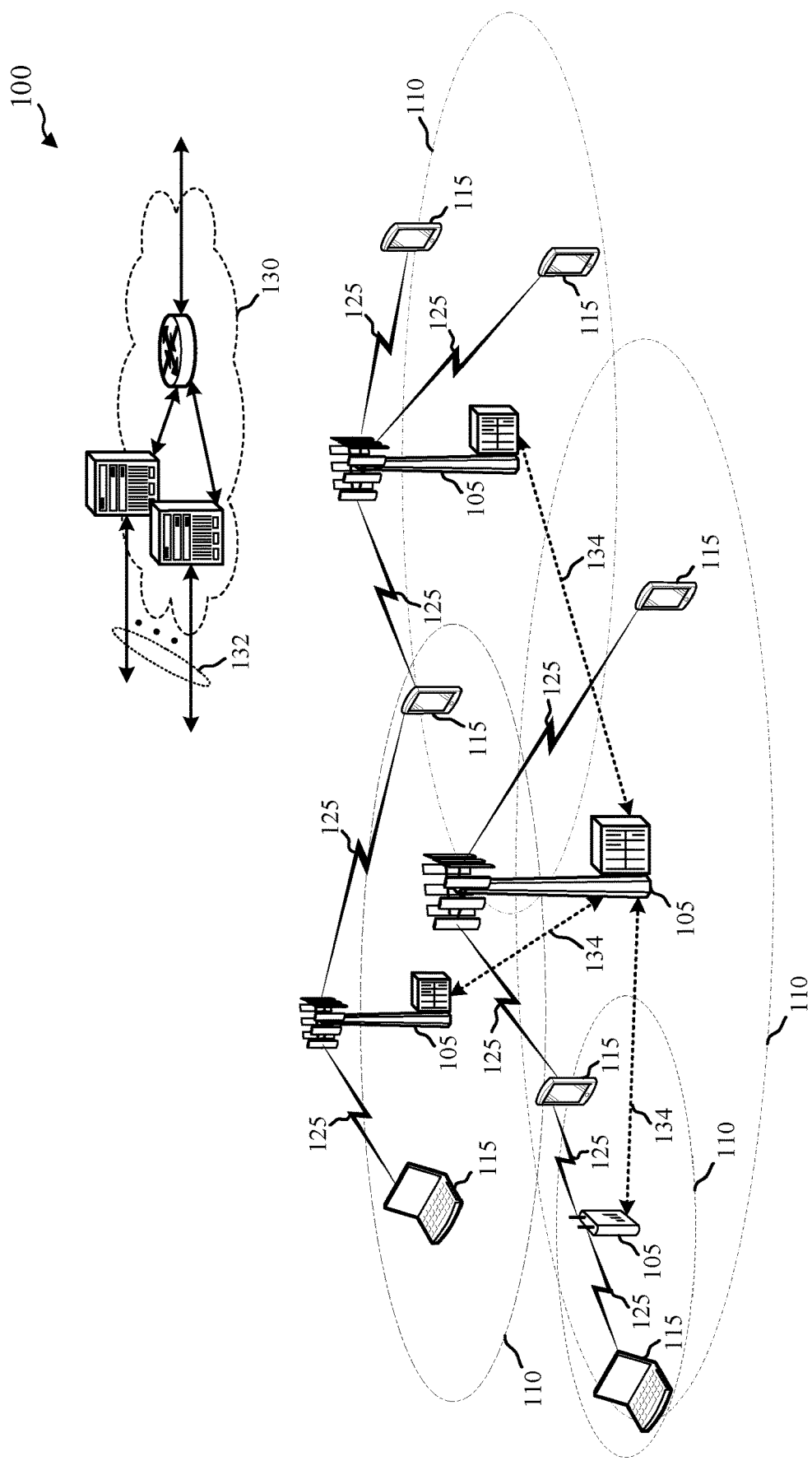
FIG. 1 illustrates an example of a system for wireless communication that supports a legacy compatible PSS/SSS design for CE and cost-reduced UEs in accordance with aspects of the present disclosure.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

Wireless communications systems as described herein may be configured to configure and transmit synchronization signals (e.g., PSS, SSS, and/or the like) within subframes of a frame to aid a UE (e.g., a CE and/or cost-reduced UE, a legacy UE, a MF UE, and/or the like) in initial acquisition and communication with a base station. As described herein, In some examples, the UE may process the synchronization signals to obtain symbol timing and subframe timing of a base station for acquiring reference signal transmissions for decoding of a channel.

Detecting of PSS timing and initial frequency offset correction are bottlenecks that lengthen the amount of time for a UE to perform initial acquisition. In conventional solutions, a base station may transmit subframes transporting PSS and SSS within DMTC windows that occur periodically (e.g., every 80, 160, or 320 milliseconds). As described above, in a legacy solution, the PSS and SSS are transmitted only once within a DMTC periodicity, and the PSS/SSS is found only within the first 32 milliseconds (e.g., 5 bits of subframe information) of the DMTC window.

As described above, in some cases, a CE and/or cost-reduced UE may coexist with a legacy UE. However, since the CE and/or cost-reduced UE may need to receive multiple instances of a PSS and/or a SSS associated with performing an initial access procedure, repetitions of the PSS/SSS are needed, and these repetitions should not interfere with operation of the legacy UEs configured to search for a single instance of the PSS/SSS (e.g., in a first subframe of a frame).

Generally, aspects described herein provide techniques and apparatuses for a legacy compatible PSS/SSS design for CE and cost-reduced UEs. In some aspects, the legacy compatible PSS/SS design for CE and cost-reduced UEs includes repetition of the PSS/SSS sequence in multiple subframes of a frame (e.g., within DMTC windows in each of the multiple subframes) where, in each repetition of the PSS/SSS sequence, the location of the PSS is swapped with the location of the SSS as compared to a legacy design. This "swapping" of the PSS and SSS prevents operation of legacy UEs from being impacted (e.g., the swapped PSS/SSS would fail SS detection at the legacy UEs and would be ignored), while allowing CE and/or cost-reduced UEs to coexist with the legacy UEs in the same frequency band.

Aspects of the disclosure are initially described in the context of a wireless communications system. The wireless communications system may provide techniques and apparatuses for a legacy compatible PSS/SSS design for CE and cost-reduced UEs. Aspects of the disclosure are further illustrated by and described with reference to apparatus diagrams, system diagrams, and flowcharts that relate to synchronization for wideband coverage enhancement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network (sometimes referred to as a 5G network). In some cases, wireless communications system 100 may support enhanced broadband communications, ultra-reliable (i.e., mission critical) communications, low latency communications, and communications with cost-reduced and low-complexity devices. In some aspects, the base station 105-$a$ may transmit a PSS and a SSS in a first set of symbols of a first subframe of a frame, wherein, within the first set of symbols of the first subframe, the SSS is transmitted in a symbol that is prior to a symbol of the first subframe in which the PSS is transmitted; and transmit the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted, as described herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, and/or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be CE, cost-reduced, or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, and/or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of Ts=1/30,720,000 seconds). Time resources may be organized according to radio frames of length of 10 ms (Tf=307200 Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
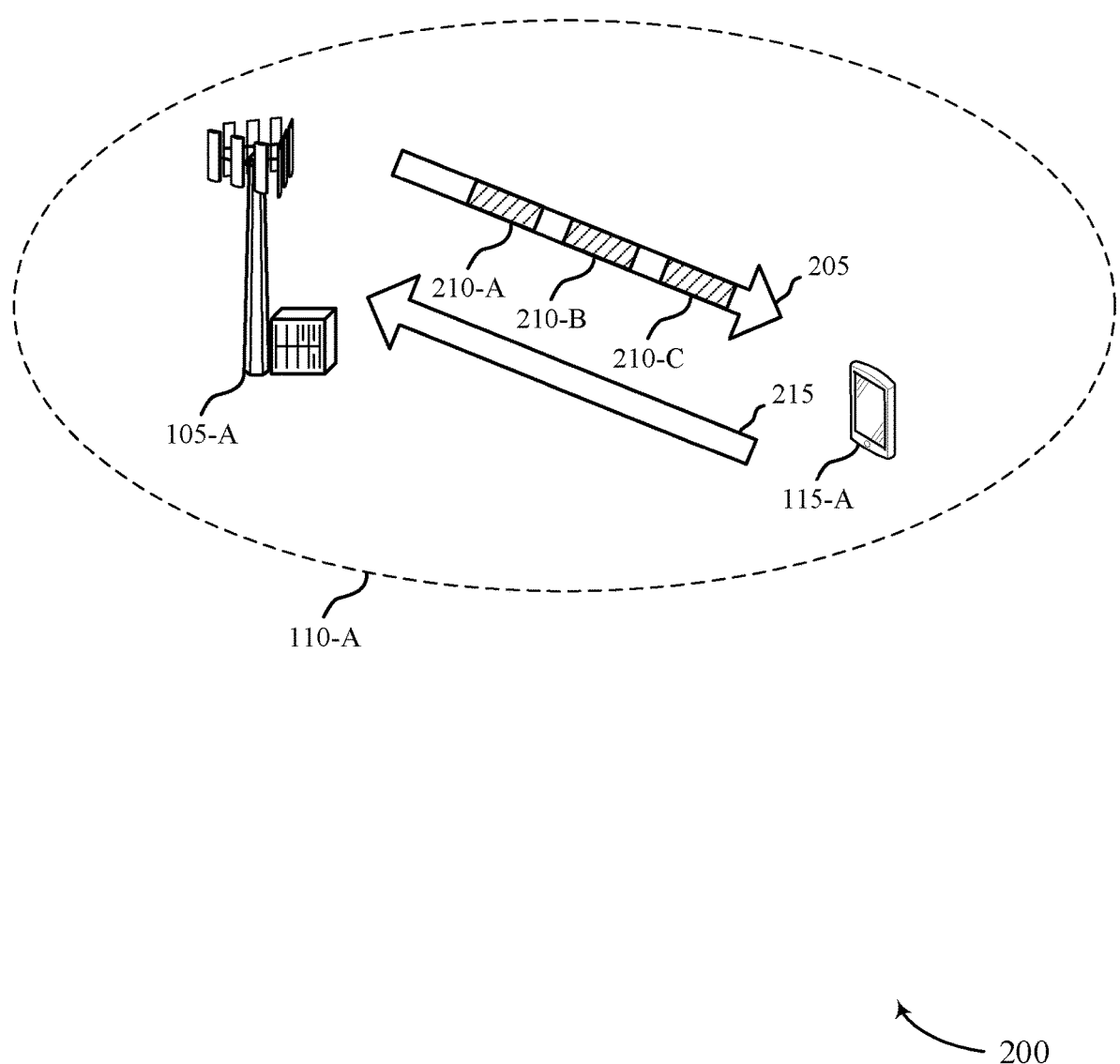
FIG. 2 illustrates an example of a wireless communications system that supports a legacy compatible PSS/SSS design for CE and cost-reduced UEs in accordance with aspects of the present disclosure.

FIG. 2 illustrates an example of a wireless communications system 200 that supports a legacy compatible PSS/SSS design for CE and cost-reduced UEs in accordance with various aspects of the present disclosure. Wireless communications system 200 includes base station 105-a and UE 115-a, which may be examples of aspects of the corresponding devices as described above with reference to FIG. 1. In the example of FIG. 2, the wireless communications system 200 may operate according to a radio access technology (RAT) such as a LTE, 5G, or new radio (NR) RAT, although techniques described herein may be applied to any RAT and to systems that may concurrently use two or more different RATs.

Base station 105-a may communicate with UE 115-a over a downlink carrier 205 and an uplink carrier 215. In some cases, base station 105-a may transmit frames 210 in allocated time and frequency resources using the downlink carrier 205. The transmitted frames 210 may include synchronization signals that may be used by UE 115-a for cell acquisition. In some cases, base station 105-a may transmit using mmW frequencies.

Figure 3:
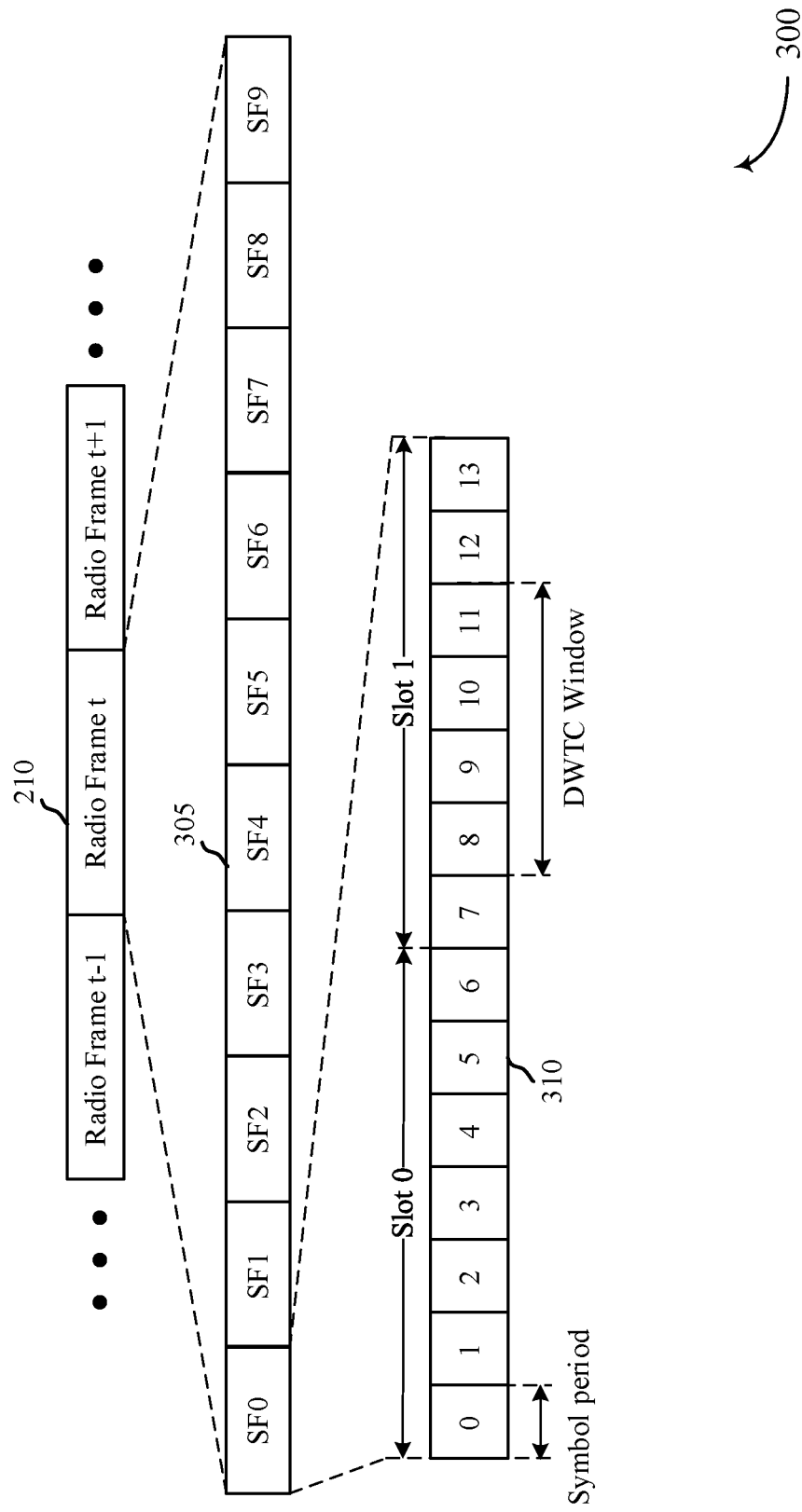
FIG. 3 illustrates an example of a frame structure that supports a legacy compatible PSS/SSS design for CE and cost-reduced UEs in accordance with aspects of the present disclosure.

FIG. 3 illustrates an example of a frame structure 300 that supports a legacy compatible PSS/SSS design for CE and cost-reduced UEs in accordance with various aspects of the present disclosure. The transmission timeline in the downlink may be partitioned into units of radio frames. Each radio frame may have a defined duration (e.g., 10 milliseconds (ms)) and may be partitioned into a defined number of subframes having corresponding indices (e.g., 10 subframes 305 with indices of 0 through 9). Each subframe 305 may include two slots. Each radio frame 210 may include 20 slots with indices of 0 through 19. Each slot may include L symbol periods 310, e.g., L=7 symbol periods 310 for a normal cyclic prefix (as shown in FIG. 2) or L=6 symbol periods 310 for an extended cyclic prefix. The 2L symbol periods 310 in each subframe may be assigned indices of 0 through 2L−1. The available time and frequency resources may be partitioned into resource blocks. Each resource block may cover N subcarriers (e.g., 12 subcarriers) in one slot. A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. In some cases, a DMTC window may be defined within a subframe that may be used to transport PSS, SSS, or both.

Figure 4:
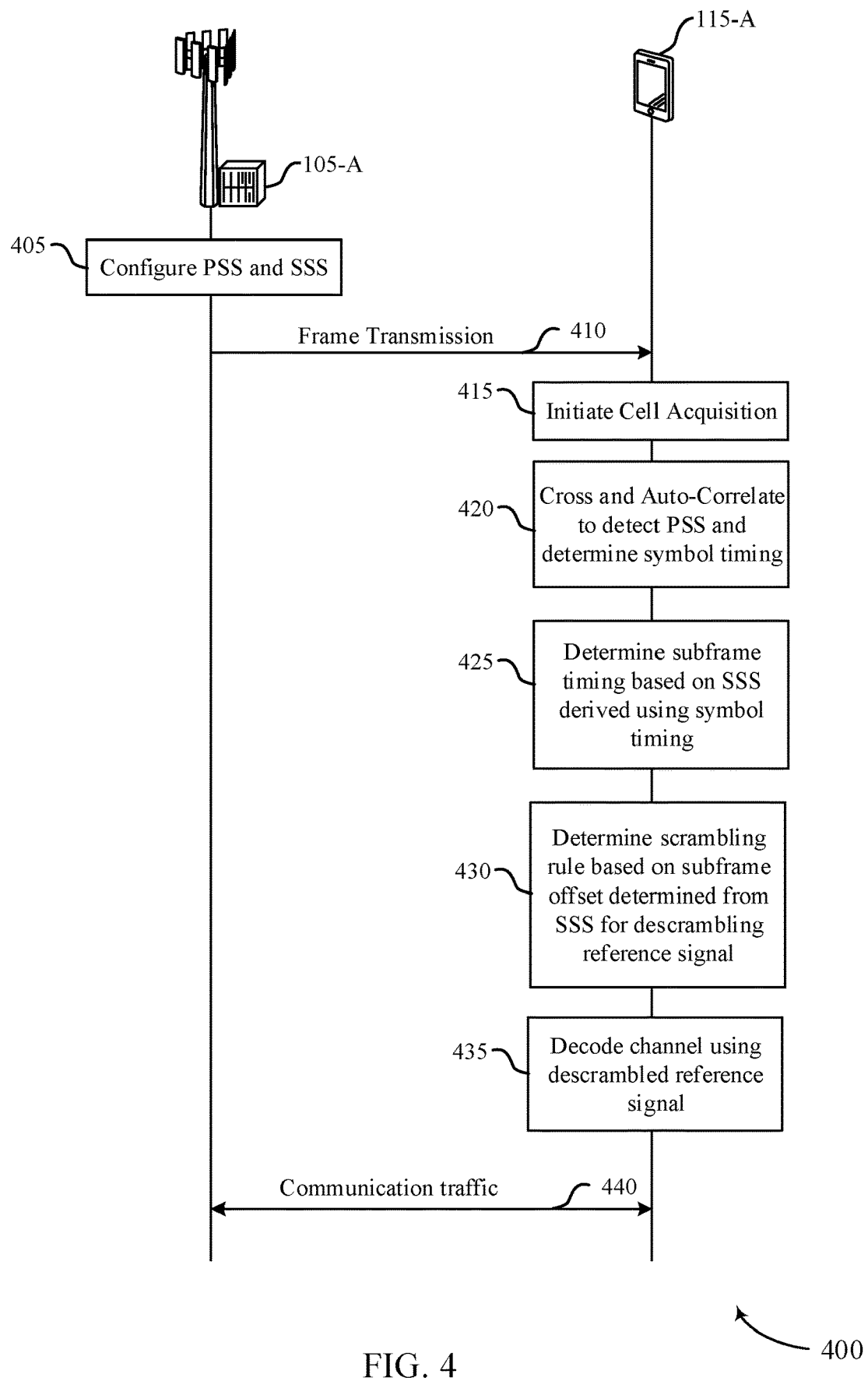
FIG. 4 illustrates an example of a process flowchart that supports a legacy compatible PSS/SSS design for CE and cost-reduced UEs in accordance with aspects of the present disclosure.

FIG. 4 illustrates an example of a process flowchart 400 that supports a legacy compatible PSS/SSS design for CE and cost-reduced UEs in accordance with various aspects of the present disclosure. In flowchart 400, a base station 105-a may transmit frames including synchronization signals which the UE 115-a may use to obtain symbol and subframe timing for cell acquisition.

At 405, the base station 105-a may configure synchronization signals for transmission in a frame.

In an example, the synchronization signals may include a PSS sequence and a SSS (e.g., a SSS generated by the base station 105-a). To enable robust PSS detection, the PSS may be a single sequence. In some examples, the base station 105-a may transmit the PSS and SSS around a center frequency of a system bandwidth allocated for transmitting the frames 210. Additional aspects of configuring PSS and SSS are described below in connection with FIG. 5.

At 410, the base station 105-a may transmit frames 210 including the PSS and SSS. In some aspects, in order to implement a legacy compatible PSS/SSS design, the base station 105-a may transmit the PSS and the SSS in a first set of symbols of a first subframe of a frame 210, wherein, within the first set of symbols of the first subframe, the SSS is transmitted in a symbol that is before (e.g., prior to) a symbol of the first subframe in which the PSS is transmitted. Further, the base station 105-a may transmit the PSS and the SSS in a first set of symbols of a second subframe of the frame 210 and in a second set of symbols of the second subframe, wherein, within the first set of symbols of the second subframe and within the second set of symbols of the second subframe, the SSS is transmitted in a symbol that is after (e.g., subsequent to) a symbol in which the PSS is transmitted. In some aspects, base station 105-a may repeat this "swapped" transmission of the PSS/SSS in additional subframes of the frame 210.

At 415, the UE 115-a may use frames 210 to initiate cell acquisition. In an example, the UE 115-a may be powered on and begin searching for a cell with which to connect.

At 420, the UE 115-a may perform cross-correlation and auto-correlation to detect the PSS and to determine symbol timing of symbol periods of subframes transmitted by the base station 105. The symbol timing may enable the UE 115-a to detect the boundaries of each symbol within a frame 210.

At 425, the UE 115-a may use the symbol timing to generate a SSS from a signal received from the base station, and determine subframe timing based on the SSS.

When the swapped PSS/SSS is repetitively transmitted, as described herein, a CE and/or cost-reduced UE 115-a may be capable of detecting the PSS and determining the symbol timing and generating the SSS, while a legacy UE 115-a may ignore these swapped repetitions, thereby allowing the CE and/or cost-reduced UE 115-a and the legacy UE 115-a to coexist in a same frequency band.

At 430, the UE 115-a may determine a subframe offset from the SSS, and determine a scrambling rule for a reference signal based on the subframe offset. In some examples, a reference signal may be a discovery reference signal (DRS), a cell-specific reference signal (CRS), a channel state information reference signal (CSI-RS), and/or the like.

At 435, the UE 115-a may descramble the reference signal using the scrambling rule, and decode a channel of the frame 210 using the descrambled reference signal. At 440, the UE 115-a may complete cell acquisition and exchange traffic with the base station 105-a using the symbol and subframe timing.

Figure 5:
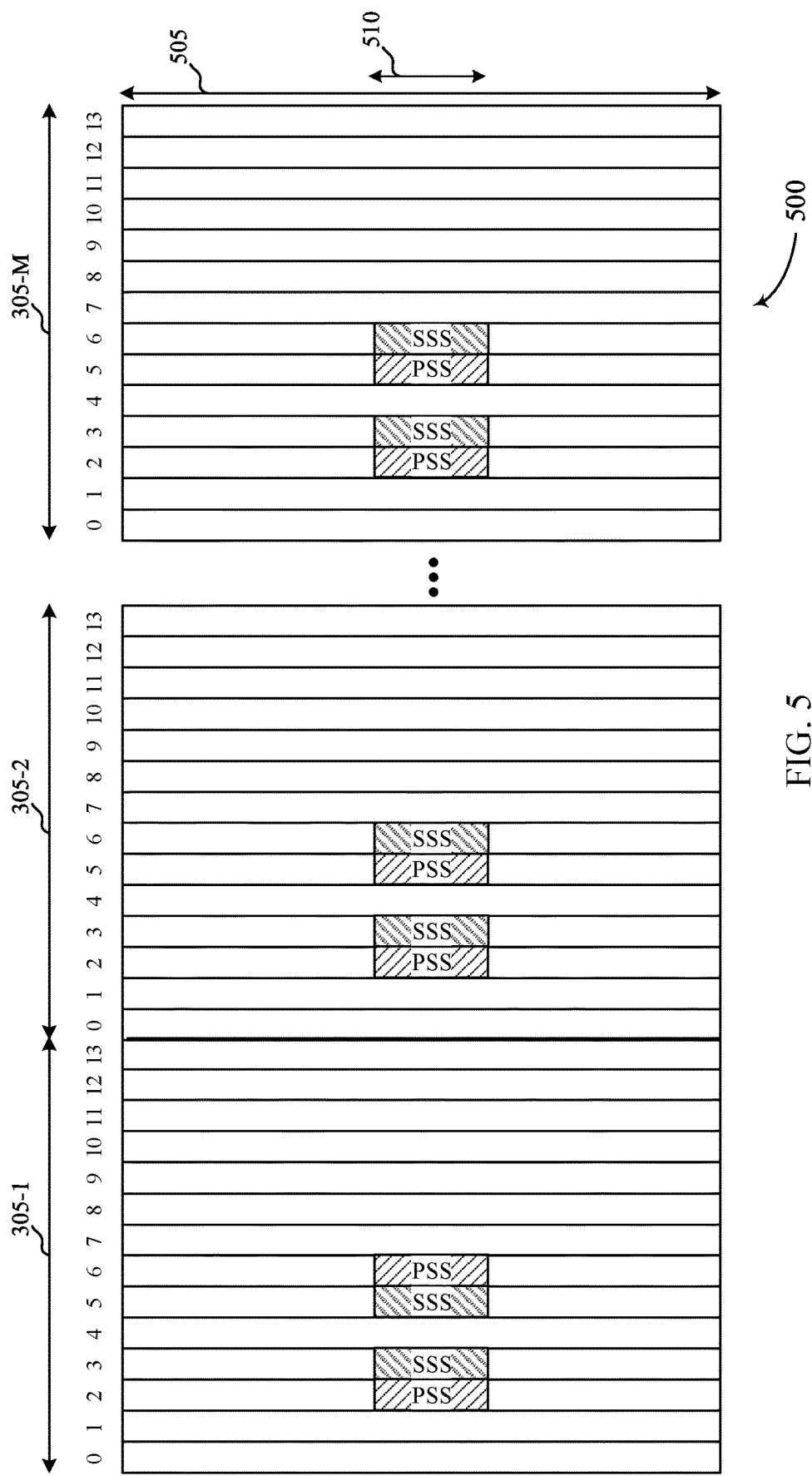
FIG. 5 illustrate an example of subframes that support a legacy compatible PSS/SSS design for CE and cost-reduced UEs in accordance with aspects of the present disclosure.

FIG. 5 illustrates an example diagram 500 of subframes that support a legacy compatible PSS/SSS design for CE and cost-reduced UEs, in accordance with various aspects of the present disclosure. In example diagram 500, time is depicted from left to right, and frequency is depicted from top to bottom. Base station 105-a may allocate time and frequency resources for frame transmission.

In example diagram 500, channel bandwidth 505 spans a portion of available frequencies, and OFDM symbols 0 to 13 of each subframe 305-1 to 305-M within the bandwidth 505 are labeled across the top of the allocated resources. As discussed above, the PSS and the SSS may be transported on R sub-carriers 510 centered within the bandwidth 505. Each of the R sub-carriers 510 may be offset by one another in frequency (e.g., 15 kHz between each sub-carrier). As shown in example diagram 500, to provide a legacy compatible PSS/SSS design for CE and/or cost-reduced UEs, the base station 105-a may transmit the PSS within a set of consecutive subframes (e.g., within symbol 2 and symbol 6 of subframe 305-1, within symbol 2 and symbol 5 of each of subframes 305-2 through 305-M). For example, if R=63, and the PSS sequence p may be a ZC sequence having a length of 63, the 63 complex numbers of the ZC sequence may be mapped to 63 sub-carriers centered within the bandwidth 505. As described above, the ZC sequence may be selected based at least in part on a cell identifier associated with the base station 105-a (e.g., one of the three ZC sequences may be selected). The same R sub-carriers 510 may also be used to transport SSS (e.g., and PBCH or PBCH extension (PBCH Ex)) in subframes 305-1 through 305-M. For example, to provide a legacy compatible PSS/SSS design for CE and/or cost-reduced UEs, the base station 105-a may transmit the SSS within the set of consecutive subframes (e.g., within symbol 3 and symbol 5 of subframe 305-1, within symbol 3 and symbol 6 of each of subframes 305-2 through 305-M).

The unlabeled portions of the time and frequency resources of subframes 305-1 to 305-M may be used to transport other information, such as, for example, legacy DRS, MF 1.0 ePSS, MF 1.0 eSSS, legacy Physical downlink Control Channel (PDCCH), SIB, MF SIB, PDCCH for SIB, and/or the like.

As shown in example diagram 500, in subframe 305-1 (e.g., in a first DMTC window) the PSS sequence may be transmitted after the SSS sequence (e.g., in symbols 6 and 5, respectively) according to a legacy design. As further shown, in some aspects, the PSS may also be repeated in subframe 305-1 and, in this repetition, the PSS sequence is transmitted before the SSS sequence (e.g., in symbols 2 and 3, respectively). In other words, in some aspects the swapped PSS/SSS may be transmitted in subframe 305-1. In some aspects, the swapped PSS/SSS may be repeated one or more additional times within subframe 305-1. In some aspects, the swapped PSS/SSS can be transmitted before and/or after the legacy (i.e., non-swapped) PSS/SSS.

As further shown in example diagram 500, in one or more other subframes of the frame, such as subframes 305-2 through 305-M (e.g., in a second DMTC window through an $M^{th}$ DMTC window), the swapped PSS and the SSS may be repeated one or more times in a given subframe. For example, as shown in subframe 305-2, the swapped PSS/SSS (i.e., the PSS sequence followed by the SSS sequence) may be repeated (e.g., the PSS may be transmitted in symbol 2 and symbol 5, while the SSS may be transmitted in symbol 3 and symbol 6). In some aspects, the swapped PSS/SSS may be repeated one or more additional times within any of subframes 305-2 through 305-M.

In example diagram 500, the PSS is repetitively transmitted before (e.g., prior to) the SSS, as described above. In some aspects, repetitively transmitting the PSS before the SSS (e.g., rather than after the SSS as in a legacy design) prevents a legacy UE from attempting initial access based on the repetitions, thereby conserving battery power and/or processor resources of the legacy UE, while preventing an impact on an initial access procedure to be performed by the legacy UE. For example, since no SSS is present before the PSS in the swapped PSS/SSS transmission, the legacy UE will stop a synchronization procedure and/or not attempt to decode a PBCH associated with these transmission, which conserves battery power and/or processor resources of the legacy UE. Further, the repetitive transmission of the swapped PSS/SSS allows a CE and/or cost-reduced UE to receive repetitions of the PSS and the SSS that may be needed in order to perform initial access. In this way, the legacy UE and the CE and/or cost-reduced UE may coexist in a same frequency band.

A PSS detector of the UE 115-a may detect a PSS within a subframe 305 for determining symbol timing of the symbol periods and for determining a cell identifier within a cell identifier group of base station 105.

Figure 6:
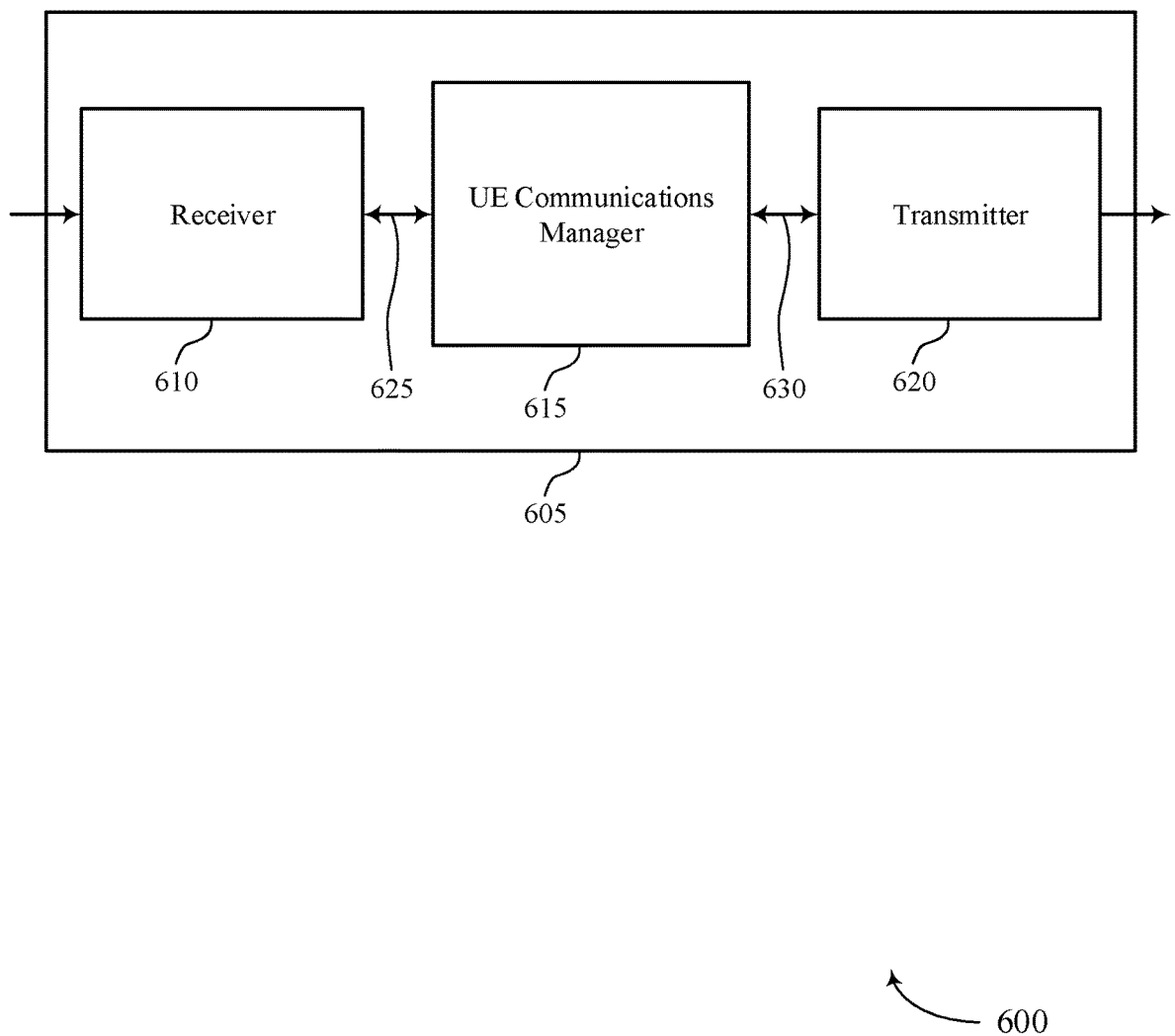
FIGS. 6 through 8 show block diagrams of a device that supports a legacy compatible PSS/SSS design for CE and cost-reduced UEs in accordance with aspects of the present disclosure.

FIG. 6 shows a block diagram 600 of a wireless device 605 that supports a legacy compatible PSS/SSS design for CE and cost-reduced UEs in accordance with aspects of the present disclosure. Wireless device 605 may be an example of aspects of a user equipment (UE) 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to a legacy compatible PSS/SSS design for CE and cost-reduced UEs, etc.). For example, receiver 610 may receive a PSS and/or a SSS based at least in part on which wireless device 605 may synchronize with a base station, as described herein. Information may be communicated between other components of the device. For example, information 625 may be communicated between receiver 610 and UE communications manager 615. Information 625 may include, for example, information associated with the PSS and/or the SSS and/or information or instructions associated with receiving the PSS and/or the SSS. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, by a UE, a signal from a base station, generate a set of symbols from the signal based on a timing hypothesis, cross-correlate the set of symbols with a sequence to generate a set of cross-correlation symbols, auto-correlate the cross-correlation symbols to generate a set of auto-correlation values, and synchronize the UE with the base station based on the auto-correlation values. The UE communications manager 615 may also generate, by a UE, a secondary synchronization signal (SSS) sequence based on a signal transmitted by a base station, determine, by the UE, a cell identifier group of a base station based on the SSS sequence, and synchronize the UE with the base station based on the SSS sequence and the cell identifier group. Information 630 may be communicated between UE communications manager 615 and transmitter 620. Information 630 may include, for example, information associated with transmitting a signal associated with synchronizing with the base station based at least in part on a received PSS and/or SSS.

Transmitter 620 may transmit signals generated by other components of the device. For example, transmitter 620 may transmit a signal, generated by UE communications manager 615, associated with synchronizing with the base station based at least in part on a received PSS and/or SSS.

In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
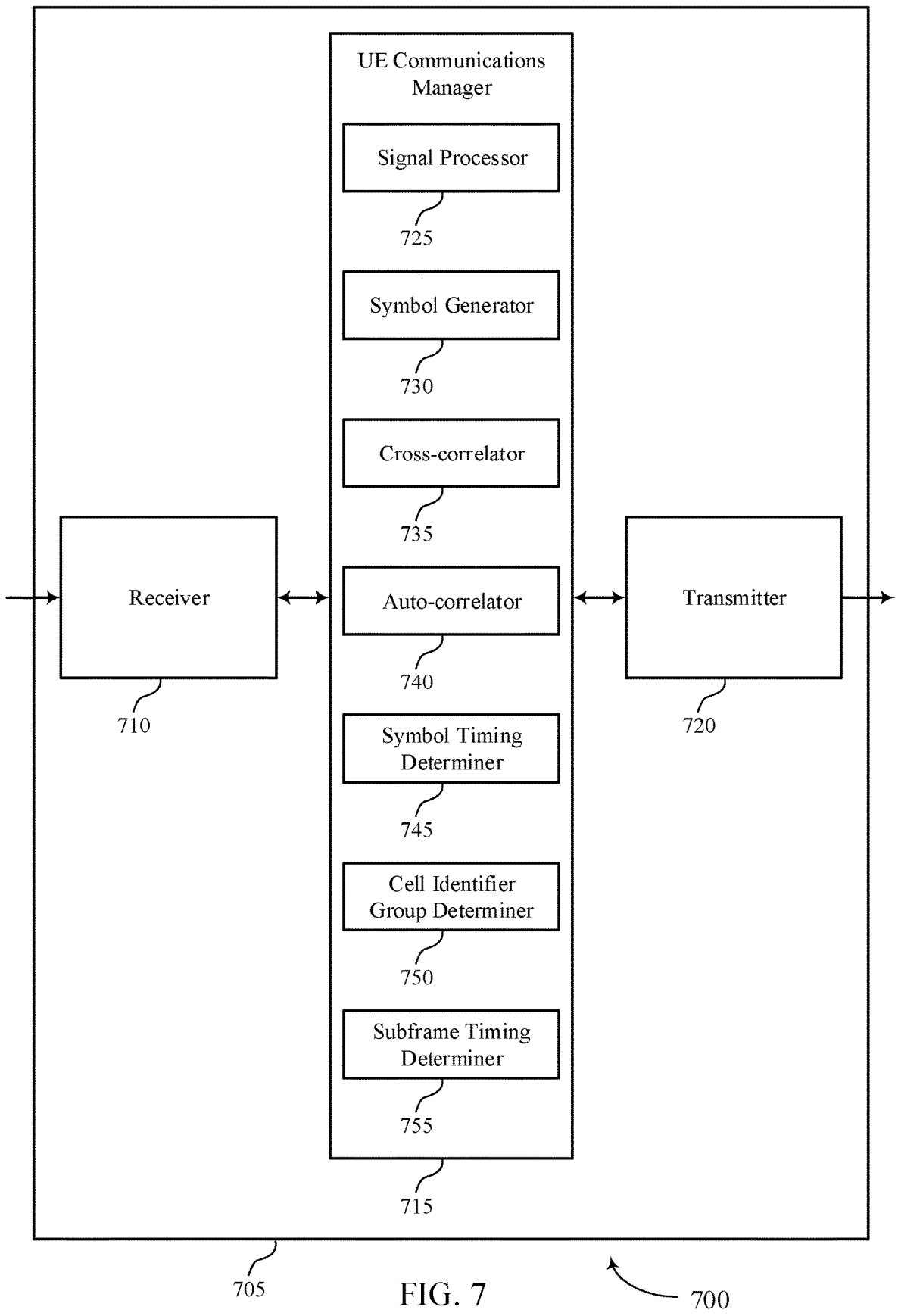

FIG. 7 shows a block diagram 700 of a wireless device 705 that supports a legacy compatible PSS/SSS design for CE and cost-reduced UEs in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to a legacy compatible PSS/SSS design for CE and cost-reduced UEs, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include signal processor 725, symbol generator 730, cross-correlator 735, auto-correlator 740, symbol timing determiner 745, cell identifier determiner 750, and subframe timing determiner 755.

Signal processor 725 may receive a signal from a base station.

Symbol generator 730 may generate a set of symbols from the signal based on a timing hypothesis, and generate a SSS sequence from the signal based on synchronizing the UE with the base station. In some cases, symbol generator 730 may generate a SSS sequence based on a signal transmitted by a base station, and receive a primary synchronization signal from a base station. In some cases, generating the set of symbols from the signal based on the timing hypothesis includes: partitioning, for each frequency bin of a set of frequency bins, a defined number of symbols from the signal into a defined number of column vectors. In some cases, the SSS sequence is generated by mapping a set of codewords generated by a shortened Reed Solomon encoder using a Galois Field alphabet and a generator polynomial to the first index. In some cases, the set of symbols from the signal are generated within a time interval corresponding to a duration of one or more subframes of a frame. In some cases, generating the SSS sequence includes: mapping a set of codewords generated by an encoder operating using a Galois Field alphabet to a root and cyclic shift. In some cases, each of the set of codewords is generated by the encoder using a generator polynomial.

Cross-correlator 735 may cross-correlate the set of symbols with a sequence to generate a set of cross-correlation symbols. In some cases, the sequence is based on a set of synchronization symbols and a cover code.

Auto-correlator 740 may auto-correlate the cross-correlation symbols to generate a set of auto-correlation values.

Symbol timing determiner 745 may synchronize the UE with the base station based on the auto-correlation values. In some cases, synchronizing the UE with the base station includes selecting one of the first timing hypothesis or the second timing hypothesis as a symbol timing of the base station. Symbol timing determiner 745 establish a symbol timing based on the primary synchronization signal, where generating the SSS sequence is based on the symbol timing.

Cell identifier determiner 750 may determine a physical cell identity of the base station based on the SSS sequence (e.g., based on a cell identifier group associated with the SSS) and the PSS sequence (e.g., based on a cell identifier associated with the PSS).

Subframe timing determiner 755 may determine subframe timing based on the SSS sequence, synchronize the UE with the base station based on the SSS sequence and the physical cell identity, and determine a subframe offset for a reference signal based on the SSS sequence. In some cases, synchronizing the UE with the base station includes determining a subframe timing of the base station based on the SSS sequence.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
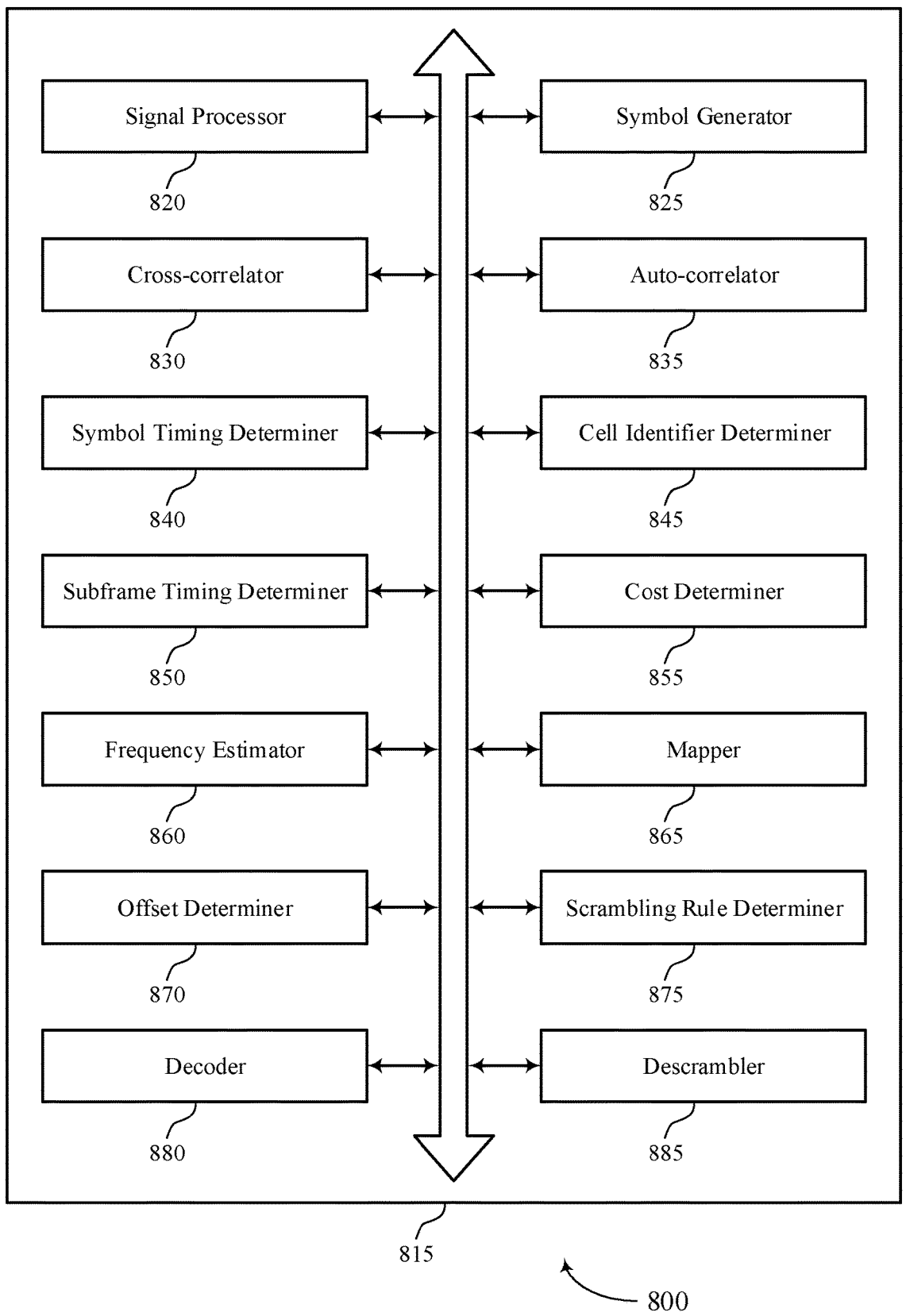

FIG. 8 shows a block diagram 800 of a UE communications manager 815 that supports a legacy compatible PSS/SSS design for CE and cost-reduced UEs in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include signal processor 820, symbol generator 825, cross-correlator 830, auto-correlator 835, symbol timing determiner 840, cell identifier determiner 845, subframe timing determiner 850, cost determiner 855, frequency estimator 860, mapper 865, offset determiner 870, scrambling rule determiner 875, decoder 880, and descrambler 885. Each of these modules may communicate, directly or indirectly, with one another (e.g., via one or more buses).

Signal processor 820 may receive a signal from a base station.

Symbol generator 825 may generate a set of symbols from the signal based on a timing hypothesis, and generate a SSS sequence from the signal based on synchronizing the UE with the base station. In some cases, symbol generator 825 may generate a SSS sequence based on a signal transmitted by a base station, and receive a primary synchronization signal from a base station. In some cases, generating the set of symbols from the signal based on the timing hypothesis includes partitioning, for each frequency bin of a set of frequency bins, a defined number of symbols from the signal into a defined number of column vectors. In some cases, the SSS sequence is generated by mapping a set of codewords generated by a shortened Reed Solomon encoder using a Galois Field alphabet and a generator polynomial to the first index. In some cases, the set of symbols from the signal are generated within a time interval corresponding to a duration of one or more subframes of a frame. In some cases, generating the SSS sequence includes mapping a set of codewords generated by an encoder operating using a Galois Field alphabet to a root and cyclic shift. In some cases, each of the set of codewords is generated by the encoder using a generator polynomial.

Cross-correlator 830 may cross-correlate the set of symbols with a sequence to generate a set of cross-correlation symbols. In some cases, the sequence is based on a set of synchronization symbols.

Auto-correlator 835 may auto-correlate the cross-correlation symbols to generate a set of auto-correlation values.

Symbol timing determiner 840 may synchronize the UE with the base station based on the auto-correlation values. In some cases, synchronizing the UE with the base station includes selecting one of the first timing hypothesis or the second timing hypothesis as a symbol timing of the base station. Symbol timing determiner 840 may establish a symbol timing based on the primary synchronization signal, where generating the SSS sequence is based on the symbol timing.

Cell identifier determiner 845 may determine a physical cell identity of the base station based on the SSS sequence (e.g., based on a cell identifier group associated with the SSS) and the PSS sequence (e.g., based on a cell identifier associated with the PSS).

Subframe timing determiner 850 may determine subframe timing based on the SSS sequence, synchronize the UE with the base station based on the SSS sequence and the physical cell identity, and determine a subframe offset for a reference signal based on the SSS sequence. In some cases, synchronizing the UE with the base station includes determining a subframe timing of the base station based on the SSS sequence.

Cost determiner 855 may compute a cost for the timing hypothesis based on the auto-correlation values, where synchronizing the UE with the base station is based on a comparison of the computed cost to a threshold. Cost determiner 855 may compute a second cost for a second timing hypothesis based on a second set of auto-correlation values, where synchronizing the UE with the base station is further based on a comparison of the second computed cost to the threshold.

Frequency estimator 860 may determine a frequency estimate for the timing hypothesis based on the computed cost.

Mapper 865 may map the SSS sequence to a first index of a set of indices and map the SSS sequence to the first index includes mapping a root and cyclic shift of the SSS sequence to the first index.

Offset determiner 870 may determine a subframe offset for a reference signal based on the SSS sequence.

Scrambling rule determiner 875 may determine a scrambling rule for the reference signal based on the subframe offset and descramble the reference signal based on the scrambling rule.

Decoder 880 may decode a channel based on the reference signal.

Descrambler 885 may determine a scrambling rule for the reference signal based on the subframe offset and descramble the reference signal based on the scrambling rule.

Figure 9:
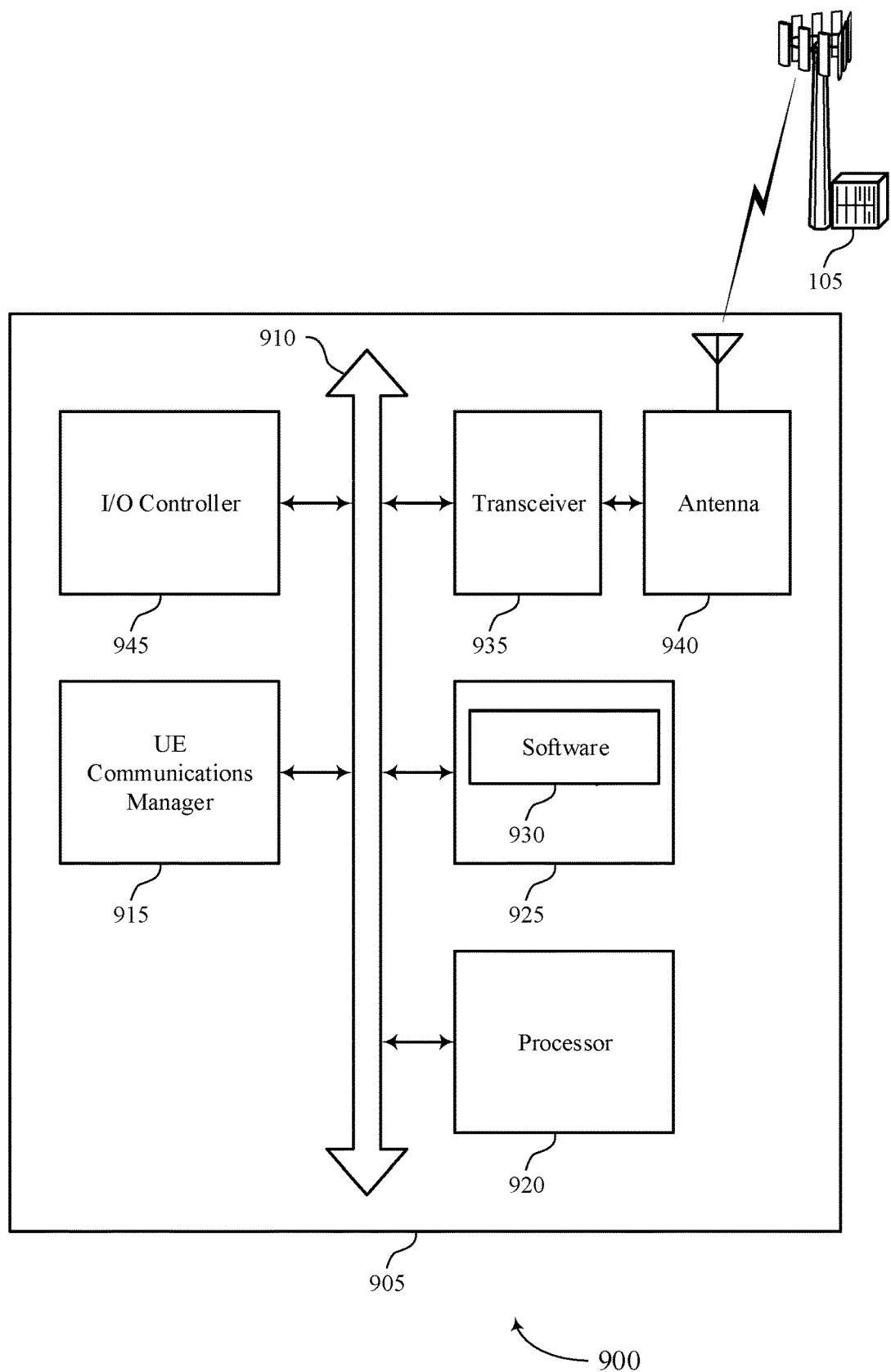
FIG. 9 illustrates a block diagram of a system including a UE that supports a legacy compatible PSS/SSS design for CE and cost-reduced UEs in accordance with aspects of the present disclosure.

FIG. 9 shows a diagram of a system 900 including a device 905 that supports a legacy compatible PSS/SSS design for CE and cost-reduced UEs in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting a legacy compatible PSS/SSS design for CE and cost-reduced UEs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support a legacy compatible PSS/SSS design for CE and cost-reduced UEs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
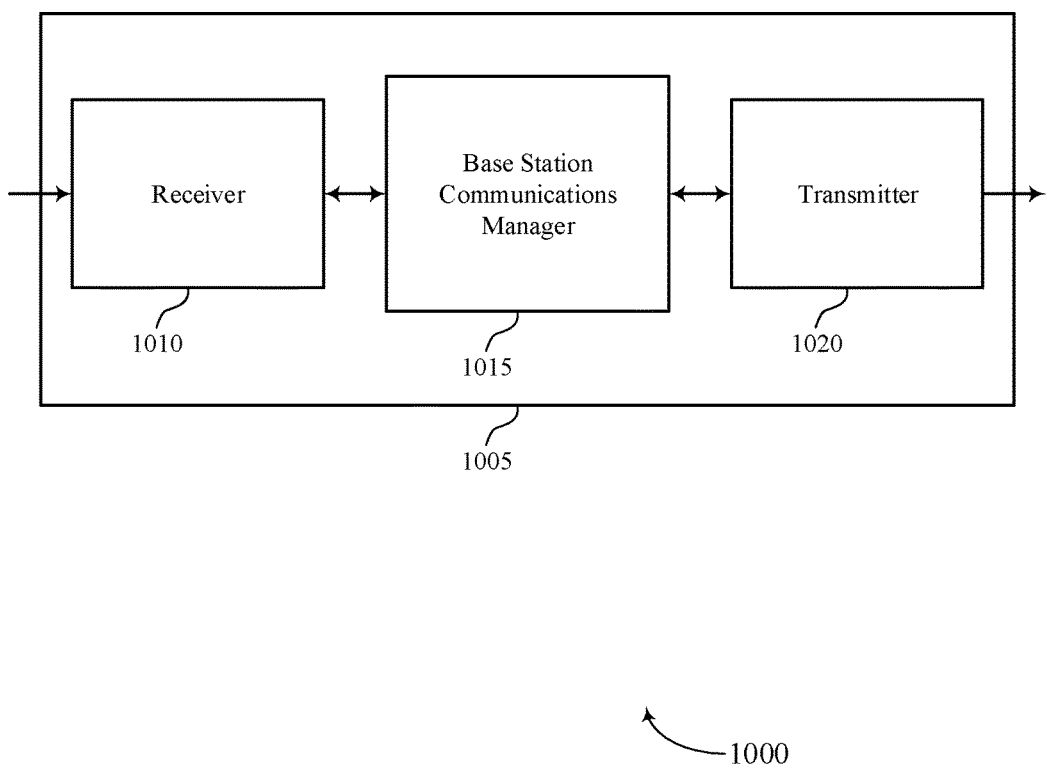
FIGS. 10 through 12 show block diagrams of a device that supports a legacy compatible PSS/SSS design for CE and cost-reduced UEs in accordance with aspects of the present disclosure.

FIG. 10 shows a block diagram 1000 of a wireless device 1005 that supports a legacy compatible PSS/SSS design for CE and cost-reduced UEs in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to a legacy compatible PSS/SSS design for CE and cost-reduced UEs, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may generate, by a shortened Reed Solomon (RS) encoder, a SSS sequence based on a cell identifier group of a base station and transmit the SSS sequence.

Transmitter 1020 may transmit signals generated by other components of the device.

In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
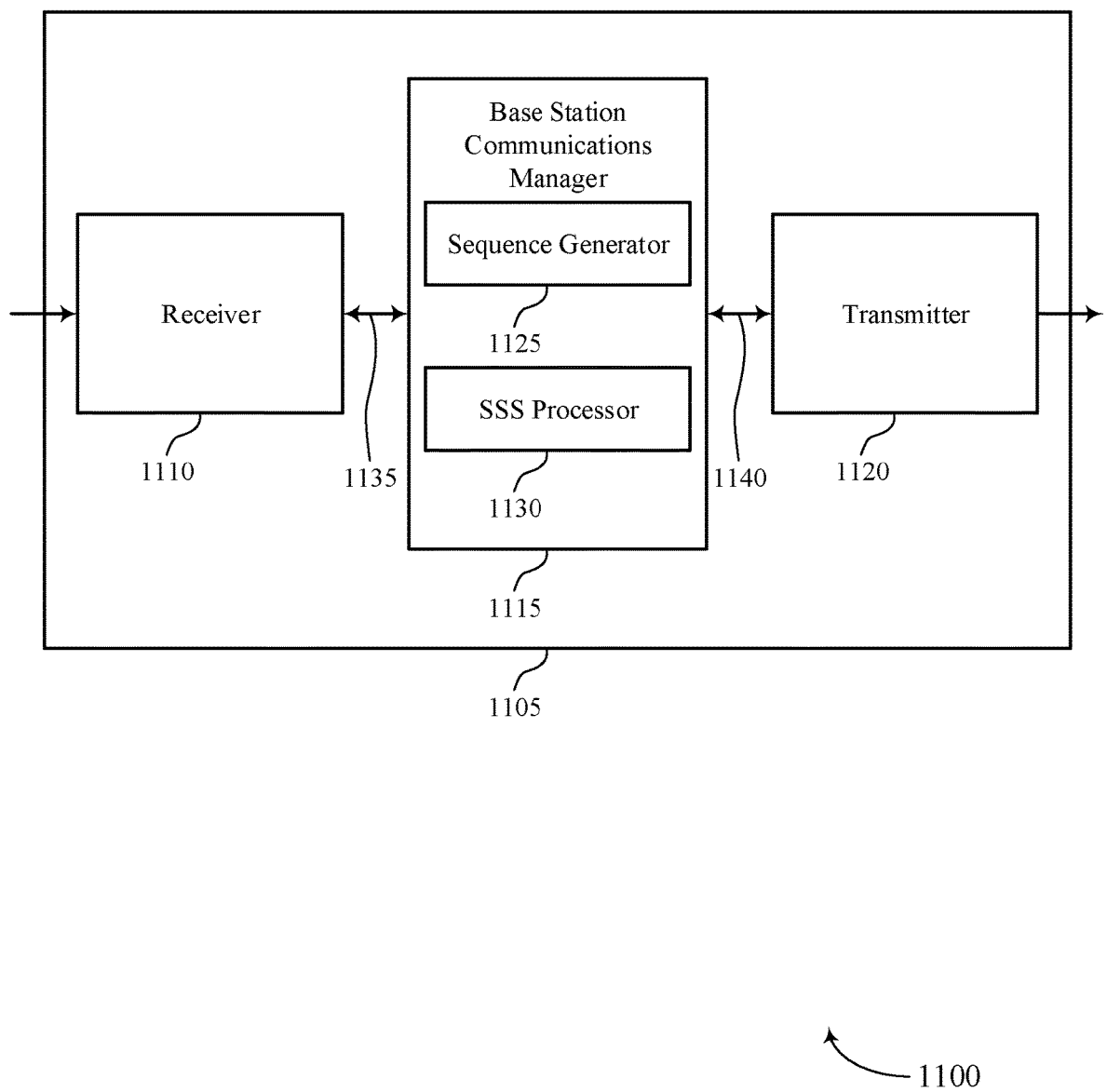

FIG. 11 shows a block diagram 1100 of a wireless device 1105 that supports a legacy compatible PSS/SSS design for CE and cost-reduced UEs in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to a legacy compatible PSS/SSS design for CE and cost-reduced UEs, etc.). For example, receiver 1110 may receive a signal associated generating a PSS and/or a SSS, a signal associated with synchronizing wireless device 1105 with a UE (e.g., based at least in part on previously transmitted PSS and/or SSS), and/or the like, as described herein. Information may be communicated between other components of the device. For example, information 1135 may be communicated between receiver 1110 and base station communications manager 1115. Information 1135 may include, for example, a signal, received from the UE, based at least in part on which wireless device 1105 may synchronize with the UE, a signal associated with generating a PSS and/or a SSS to be transmitted by wireless device 1105, and/or the like. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include sequence generator 1125 and SSS processor 1130.

Sequence generator 1125 may generate, by a shortened Reed Solomon (RS) encoder, a SSS sequence based on a cell identifier group of a base station and generate the SSS sequence is further based on a subframe offset of a reference signal within a frame. In some cases, the SSS sequence is a Zadoff-Chu sequence having a defined root and a defined cyclic shift.

SSS processor 1130 may transmit the SSS sequence.

Information 1140 may be communicated between base station communications manager 1115 and transmitter 1120. Information 1140 may include, for example, information associated with transmitting a SSS (e.g., a SSS generated by base station communications manager 1115) and/or a PSS, information associated with a received signal associated with synchronizing with a UE, and/or the like.

Transmitter 1120 may transmit signals generated by other components of the device. In some examples, the transmitter 1120 may be collocated with a receiver 1110 in a transceiver module. For example, transmitter 1120 may transmit a PSS and/or a SSS generated by base station communications manager 1115, and/or another type of information. For example, the transmitter 1120 may be an example of aspects of the transceiver 1335 described with reference to FIG. 13. The transmitter 1120 may utilize a single antenna or a set of antennas.

Figure 12:
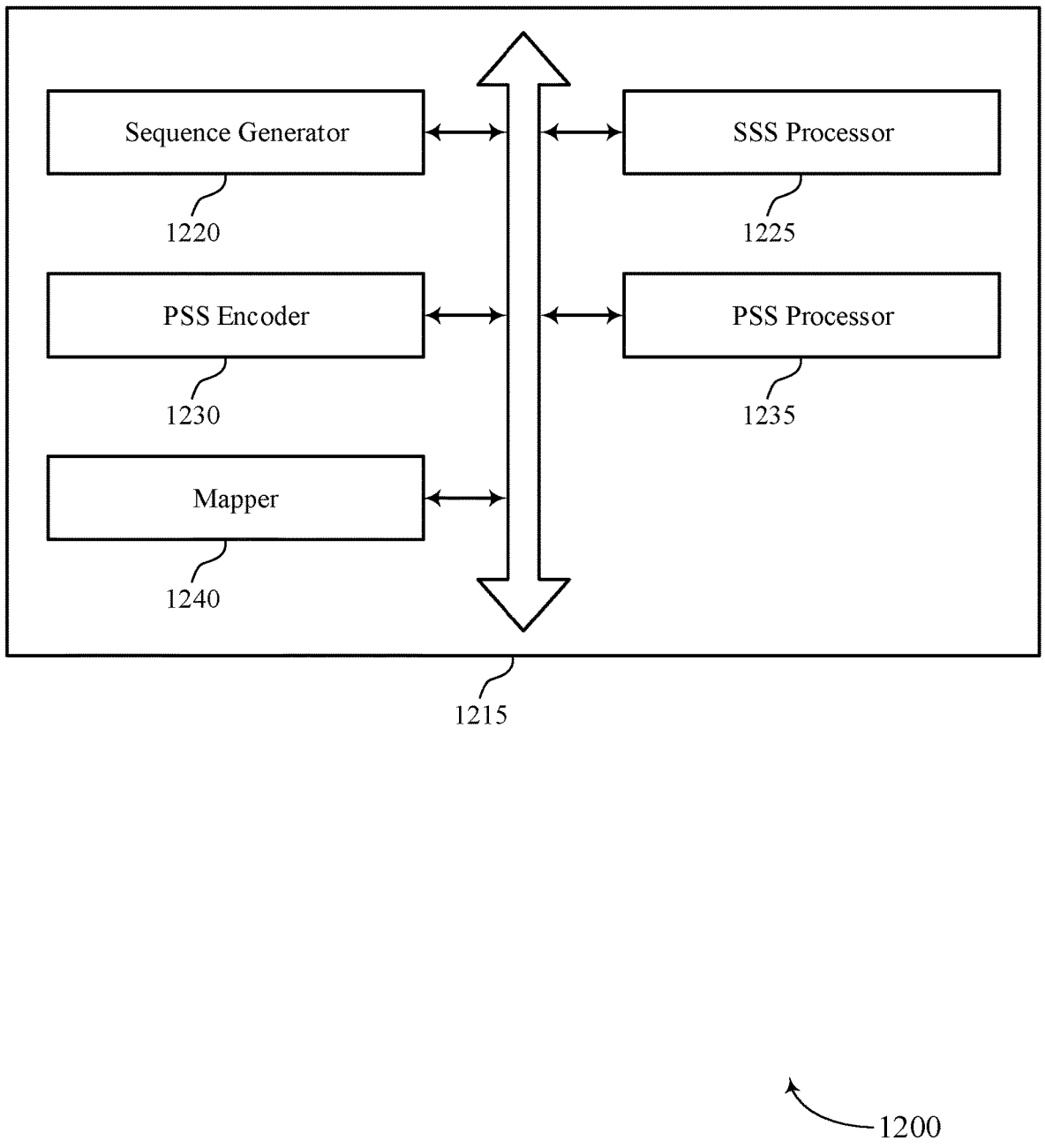

FIG. 12 shows a block diagram 1200 of a base station communications manager 1215 that supports a legacy compatible PSS/SSS design for CE and cost-reduced UEs in accordance with aspects of the present disclosure. The base station communications manager 1215 may be an example of aspects of a base station communications manager 1315 described with reference to FIGS. 10, 11, and 13. The base station communications manager 1215 may include sequence generator 1220, SSS processor 1225, primary synchronization signal (PSS) encoder 1230, PSS processor 1235, and mapper 1240. Each of these modules may communicate, directly or indirectly, with one another (e.g., via one or more buses).

Sequence generator 1220 may generate, by a shortened Reed Solomon (RS) encoder, a SSS sequence based on a cell identifier group of a base station and generate the SSS sequence is further based on a subframe offset of a reference signal within a frame. In some cases, the SSS sequence is a Zadoff-Chu sequence having a defined root and a defined cyclic shift.

SSS processor 1225 may transmit the SSS sequence.

PSS encoder 1230 may encode a PSS sequence to generate an encoded PSS sequence.

PSS processor 1235 may transmit the encoded PSS sequence a defined number of times within a subframe of a frame.

Mapper 1240 may store a table mapping a Galois Field alphabet to a set of Zadoff-Chu sequences each having a defined root and a defined cyclic shift.

Figure 13:
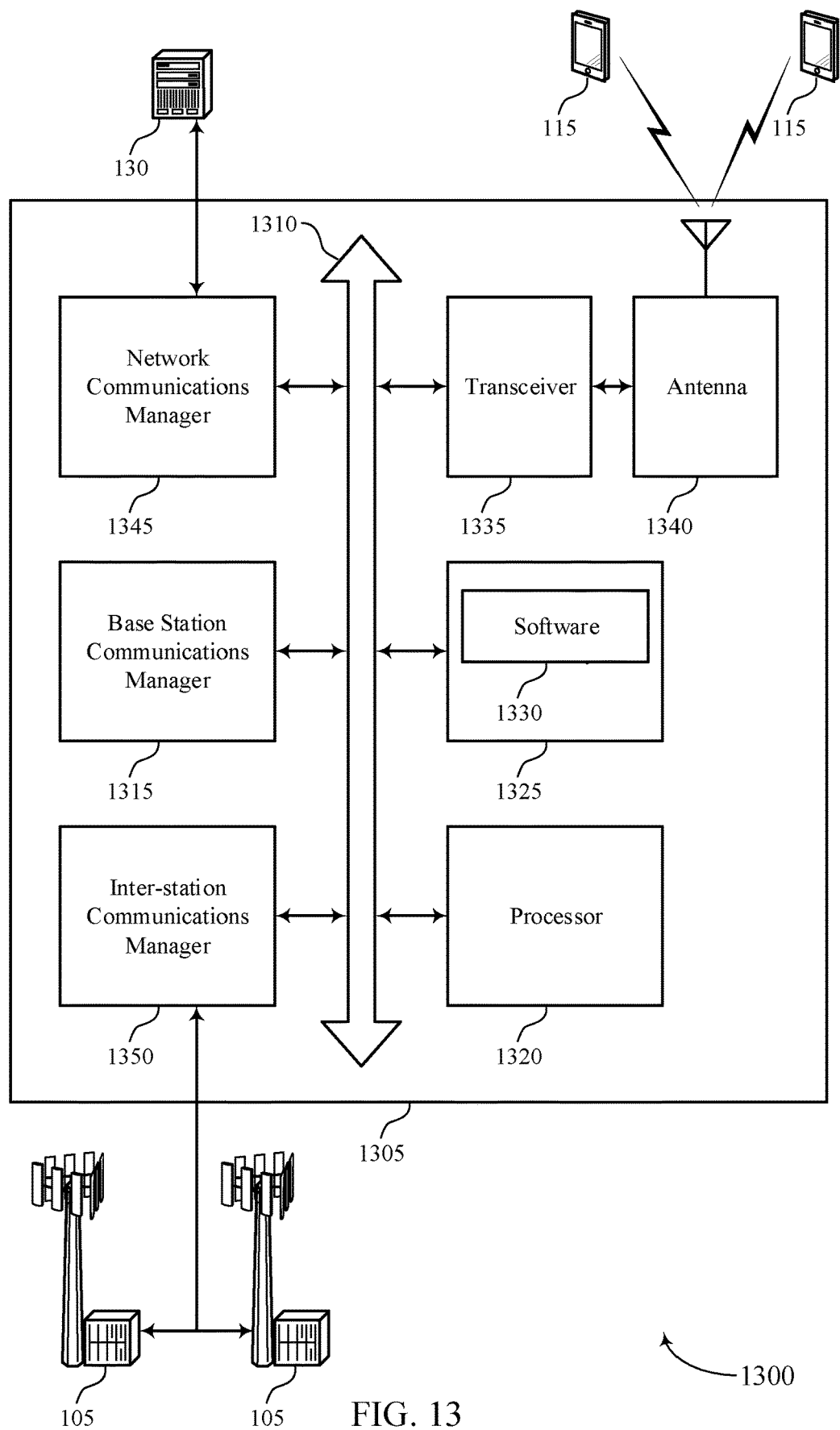
FIG. 13 illustrates a block diagram of a system including a base station that supports a legacy compatible PSS/SSS design for CE and cost-reduced UEs in accordance with aspects of the present disclosure.

FIG. 13 shows a diagram of a system 1300 including a device 1305 that supports a legacy compatible PSS/SSS design for CE and cost-reduced UEs in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting a legacy compatible PSS/SSS design for CE and cost-reduced UEs).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support a legacy compatible PSS/SSS design for CE and cost-reduced UEs. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
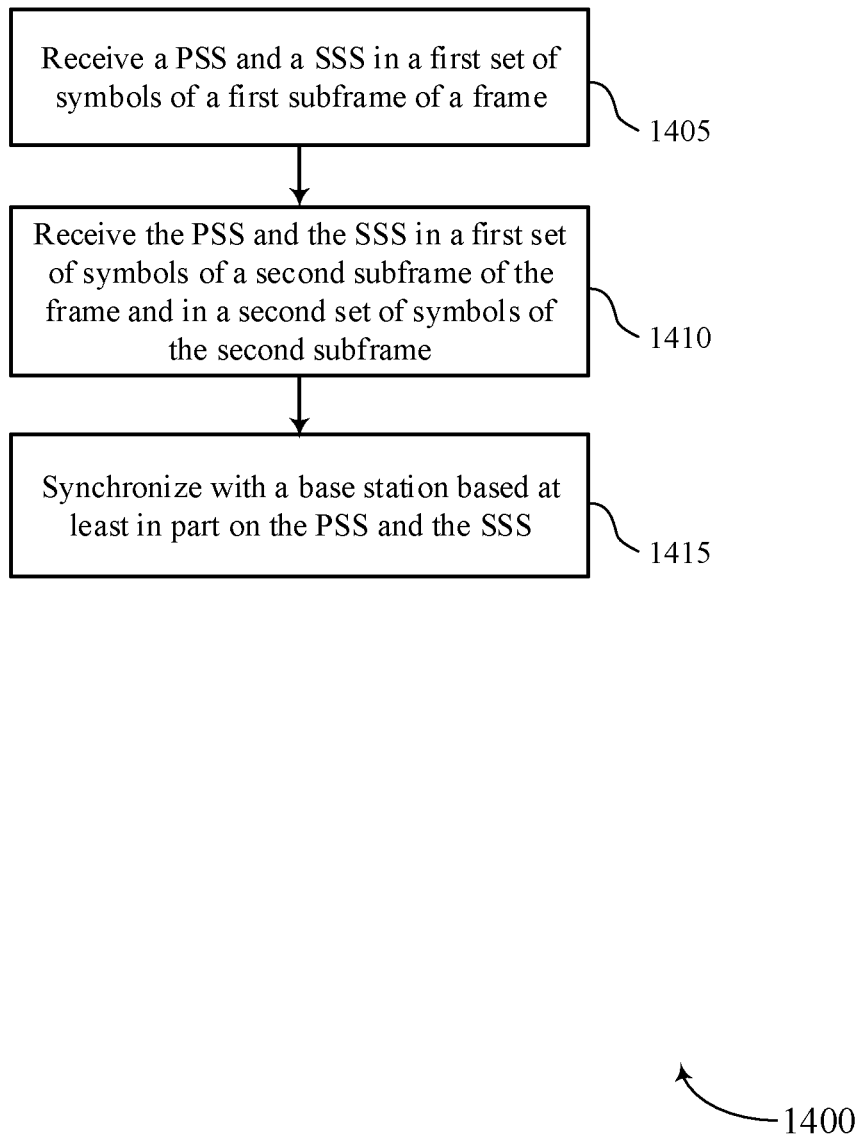
FIGS. 14 and 15 illustrate methods for a legacy compatible PSS/SSS design for CE and cost-reduced UEs in accordance with aspects of the present disclosure.

FIG. 14 shows a flowchart illustrating a method 1400 for a legacy compatible PSS/SSS design for CE and cost-reduced UEs in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive a PSS and a SSS in a first set of symbols of a first subframe of a frame. For example, the UE 115 may receive a PSS and a SSS in a first set of symbols of a first subframe of a frame, wherein, within the first set of symbols of the first subframe, the SSS is received in a symbol that is before (e.g., prior to) a symbol of the first subframe in which the PSS is received, as described above. The operations of block 1405 may be performed according to the methods described herein. In certain examples, aspects of the operations of block 1405 may be performed by a signal processor as described with reference to FIGS. 6 through 9.

At 1410, the UE 115 may receive the PSS and the SSS in a first set of symbols of a second subframe of the frame and in a second set of symbols of the second subframe. For example, the UE 115 may receive the PSS and the SSS in a first set of symbols of a second subframe of the frame and in a second set of symbols of the second subframe, wherein, within the first set of symbols of the second subframe and within the second set of symbols of the second subframe, the SSS is received in a symbol that is after (e.g., subsequent to) a symbol in which the PSS is received, as described above. The operations of block 1410 may be performed according to the methods described herein. In certain examples, aspects of the operations of block 1410 may be performed by a symbol generator as described with reference to FIGS. 6 through 9.

At 1415, the UE 115 may synchronize with the base station 105 based at least in part on the PSS and the SSS. The operations of block 1415 may be performed according to the methods described herein. In certain examples, aspects of the operations of block 1415 may be performed by a symbol generator as described with reference to FIGS. 6 through 9.

In some aspects, the PSS and the SSS are received in a second set of symbols of the first subframe, wherein, within the second set of symbols of the first subframe, the SSS is received in a symbol that is subsequent to a symbol in which the PSS is received. In some aspects, within the first subframe, the first set of symbols is before the second set of symbols. In some aspects, within the first subframe, the first set of symbols is after the second set of symbols.

In some aspects, the PSS and the SSS are received in a first set of symbols of a third subframe of the frame and in a second set of symbols of the third subframe, wherein, within the first set of symbols of the third subframe and within the second set of symbols of the third subframe, the SSS is received in a symbol that is subsequent to a symbol in which the PSS is received.

In some aspects, the PSS and the SSS are received in at least a third set of symbols of the first subframe or at least a third set of symbols of the second subframe, wherein, within the at least third set of symbols of the first subframe or the at least third set of symbols of the second subframe, the SSS is received in a symbol that is subsequent to a symbol in which the PSS is received.

In some aspects, the first set of symbols of the second subframe includes a third symbol of the second subframe and a fourth symbol of the second subframe.

In some aspects, the second set of symbols of the second subframe includes a sixth symbol of the second subframe and a seventh symbol of the second subframe.

Figure 15:
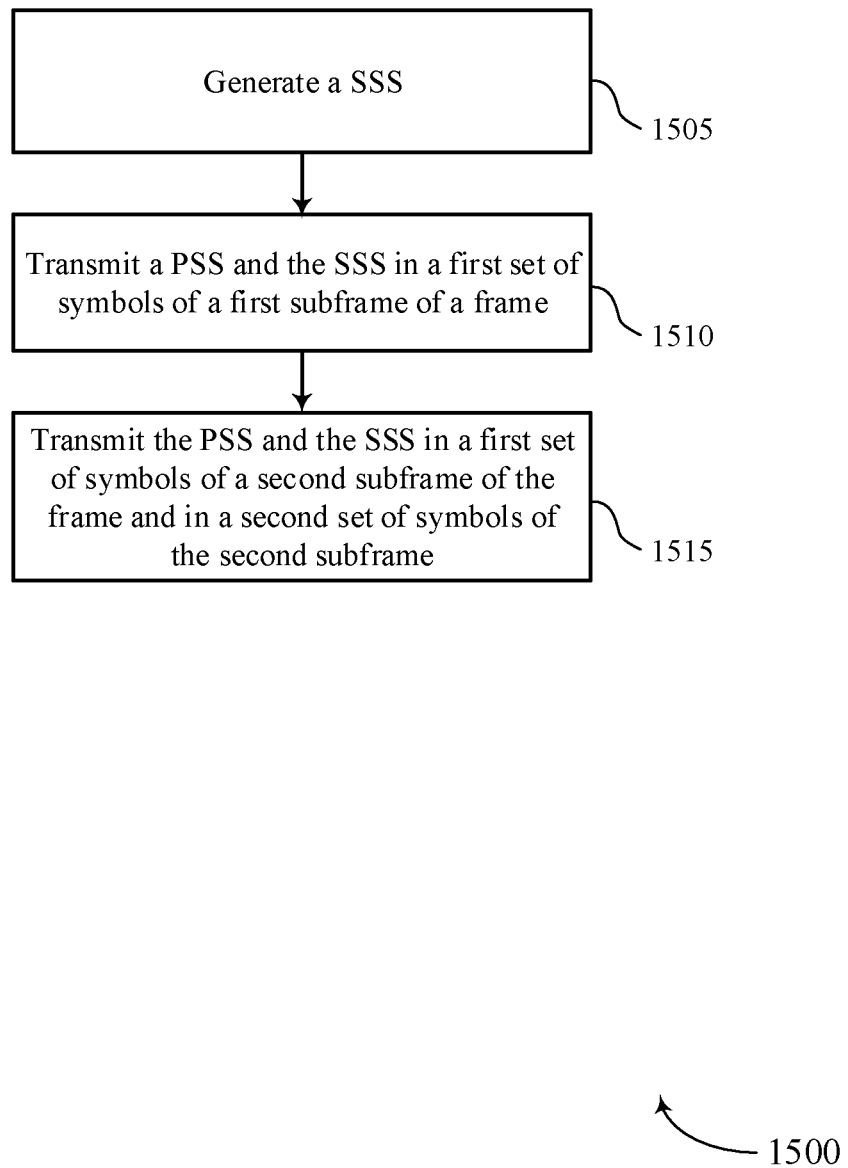

FIG. 15 shows a flowchart illustrating a method 1500 for a legacy compatible PSS/SSS design for CE and cost-reduced UEs in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1505, the base station 105 may generate a SSS. The operations of block 1505 may be performed according to the methods described herein. In certain examples, aspects of the operations of block 1505 may be performed by a sequence generator as described with reference to FIGS. 10 through 13.

At 1510, the base station 105 may transmit a PSS and the SSS in a first set of symbols of a first subframe of a frame. For example, the base station 105 may transmit the PSS and the SSS in a first set of symbols of a first subframe of a frame, wherein, within the first set of symbols of the first subframe, the SSS is transmitted in a symbol that is prior to a symbol of the first subframe in which the PSS is transmitted, as described above. The operations of block 1510 may be performed according to the methods described herein. In certain examples, aspects of the operations of block 1510 may be performed by a SSS processor as described with reference to FIGS. 10 through 13.

At 1515, the base station 105 may transmit the PSS and the SSS in a first set of symbols of a second subframe of the frame and in a second set of symbols in the second subframe. For example, the base station 105 may transmit the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted, as described above. The operations of block 1515 may be performed according to the methods described herein. In certain examples, aspects of the operations of block 1515 may be performed by a SSS processor as described with reference to FIGS. 10 through 13.

In some aspects, the PSS and the SSS are transmitted in a second set of symbols of the first subframe, wherein, within the second set of symbols of the first subframe, the SSS is transmitted in a symbol that is subsequent to a symbol in which the PSS is transmitted.

In some aspects, within the first subframe, the first set of symbols is before the second set of symbols. In some aspects, within the first subframe, the first set of symbols is after the second set of symbols.

In some aspects, the PSS and the SSS are transmitted in a first set of symbols of a third subframe of the frame and in a second set of symbols of the third subframe, wherein, within the first set of symbols of the third subframe and within the second set of symbols of the third subframe, the SSS is transmitted in a symbol that is subsequent to a symbol in which the PSS is transmitted.

In some aspects, the PSS and the SSS are transmitted in at least a third set of symbols of the first subframe or at a third set of symbols of the second subframe, wherein, within the at least third set of symbols of the first subframe or the at least third set of symbols of the second subframe, the SSS is transmitted in a symbol that is subsequent to a symbol in which the PSS is transmitted.

In some aspects, the first set of symbols of the second subframe includes a third symbol of the second subframe and a fourth symbol of the second subframe.

In some aspects, the second set of symbols of the second subframe includes a sixth symbol of the second subframe and a seventh symbol of the second subframe.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, comprising:
receiving, by a user equipment (UE), a primary synchronization signal (PSS) and a secondary synchronization signal (SSS) in a first set of symbols of a first subframe of a frame,
    wherein, within the first set of symbols of the first subframe, the SSS is received in a symbol that is prior to a symbol of the first subframe in which the PSS is received;
receiving, by the UE, the PSS and the SSS in a first set of symbols of a second subframe of the frame and in a second set of symbols of the second subframe,
    wherein, within the first set of symbols of the second subframe and within the second set of symbols of the second subframe, the SSS is received in a symbol that is subsequent to a symbol in which the PSS is received; and
synchronizing, by the UE, with a base station based at least in part on the PSS and the SSS.

2. The method of claim 1, wherein the PSS and the SSS are received in a second set of symbols of the first subframe,
    wherein, within the second set of symbols of the first subframe, the SSS is received in a symbol that is after a symbol in which the PSS is received.

3. The method of claim 2, wherein, within the first subframe, the first set of symbols is before the second set of symbols.

4. The method of claim 2, wherein, within the first subframe, the first set of symbols is after the second set of symbols.

5. The method of claim 1, wherein the PSS and the SSS are received in a first set of symbols of a third subframe of the frame and in a second set of symbols of the third subframe,
    wherein, within the first set of symbols of the third subframe and within the second set of symbols of the third subframe, the SSS is received in a symbol that is subsequent to a symbol in which the PSS is received.

6. The method of claim 1, wherein the PSS and the SSS are received in a third set of symbols of the first subframe or a third set of symbols of the second subframe,
    wherein, within the third set of symbols of the first subframe or the third set of symbols of the second subframe, the SSS is received in a symbol that is subsequent to a symbol in which the PSS is received.

7. The method of claim 1, wherein the first set of symbols of the second subframe includes a third symbol of the second subframe and a fourth symbol of the second subframe.

8. The method of claim 1, wherein the second set of symbols of the second subframe includes a sixth symbol of the second subframe and a seventh symbol of the second subframe.

9. A user equipment for wireless communication, comprising:
memory; and
one or more processors coupled to the memory, the memory and the one or more processors configured to:
    receive a primary synchronization signal (PSS) and a secondary synchronization signal (SSS) in a first set of symbols of a first subframe of a frame,
        wherein, within the first set of symbols of the first subframe, the SSS is received in a symbol that is prior to a symbol of the first subframe in which the PSS is received;
    receive the PSS and the SSS in a first set of symbols of a second subframe of the frame and in a second set of symbols of the second subframe,
        wherein, within the first set of symbols of the second subframe and within the second set of symbols of the second subframe, the SSS is received in a symbol that is subsequent to a symbol in which the PSS is received; and
    synchronize with a base station based at least in part on the PSS and the SSS.

10. The user equipment of claim 9, wherein the PSS and the SSS are received in a second set of symbols of the first subframe,
    wherein, within the second set of symbols of the first subframe, the SSS is received in a symbol that is subsequent to a symbol in which the PSS is received.

11. The user equipment of claim 10, wherein, within the first subframe, the first set of symbols is before the second set of symbols.

12. The user equipment of claim 10, wherein, within the first subframe, the first set of symbols is after the second set of symbols.

13. The user equipment of claim 9, wherein the PSS and the SSS are received in a first set of symbols of a third subframe of the frame and in a second set of symbols of the third subframe,
    wherein, within the first set of symbols of the third subframe and within the second set of symbols of the third subframe, the SSS is received in a symbol that is subsequent to a symbol in which the PSS is received.

14. The user equipment of claim 9, wherein the PSS and the SSS are received in a third set of symbols of the first subframe or a third set of symbols of the second subframe,
    wherein, within the third set of symbols of the first subframe or the third set of symbols of the second subframe, the SSS is received in a symbol that is subsequent to a symbol in which the PSS is received.

15. The user equipment of claim 9, wherein the first set of symbols of the second subframe includes a third symbol of the second subframe and a fourth symbol of the second subframe.

16. A method for wireless communication, comprising:
transmitting, by a base station, a primary synchronization signal (PSS) and a secondary synchronization signal (SSS) in a first set of symbols of a first subframe of a frame, wherein, within the first set of symbols of the first subframe, the SSS is transmitted in a symbol that is prior to a symbol of the first subframe in which the PSS is transmitted; and transmitting, by the base station, the PSS and the SSS in a first set of symbols of a second subframe of the frame and in a second set of symbols of the second subframe, wherein, within the first set of symbols of the second subframe and within the second set of symbols of the second subframe, the SSS is transmitted in a symbol that is subsequent to a symbol in which the PSS is transmitted.

17. The method of claim 16, wherein the PSS and the SSS are transmitted in a second set of symbols of the first subframe,
wherein, within the second set of symbols of the first subframe, the SSS is transmitted in a symbol that is subsequent to a symbol in which the PSS is transmitted.

18. The method of claim 17, wherein, within the first subframe, the first set of symbols is before the second set of symbols.

19. The method of claim 17, wherein, within the first subframe, the first set of symbols is after the second set of symbols.

20. The method of claim 16, wherein the PSS and the SSS are transmitted in a first set of symbols of a third subframe of the frame and in a second set of symbols of the third subframe,
wherein, within the first set of symbols of the third subframe and within the second set of symbols of the third subframe, the SSS is transmitted in a symbol that is subsequent to a symbol in which the PSS is transmitted.

21. The method of claim 16, wherein the PSS and the SSS are transmitted in a third set of symbols of the first subframe or a third set of symbols of the second subframe,
wherein, within the third set of symbols of the first subframe or the third set of symbols of the second subframe, the SSS is transmitted in a symbol that is subsequent to a symbol in which the PSS is transmitted.

22. The method of claim 16, wherein the first set of symbols of the second subframe includes a third symbol of the second subframe and a fourth symbol of the second subframe.

23. The method of claim 16, wherein the second set of symbols of the second subframe includes a sixth symbol of the second subframe and a seventh symbol of the second subframe.

24. A base station for wireless communication, comprising:
memory; and
one or more processors coupled to the memory, the memory and the one or more processors configured to:
transmit a primary synchronization signal (PSS) and a secondary synchronization signal (SSS) in a first set of symbols of a first subframe of a frame,
wherein, within the first set of symbols of the first subframe, the SSS is transmitted in a symbol that is prior to a symbol of the first subframe in which the PSS is transmitted; and
transmit the PSS and the SSS in a first set of symbols of a second subframe of the frame and in a second set of symbols of the second subframe,
wherein, within the first set of symbols of the second subframe and within the second set of symbols of the second subframe, the SSS is transmitted in a symbol that is subsequent to a symbol in which the PSS is transmitted.

25. The base station of claim 24, wherein the PSS and the SSS are transmitted in a second set of symbols of the first subframe,
wherein, within the second set of symbols of the first subframe, the SSS is transmitted in a symbol that is subsequent to a symbol in which the PSS is transmitted.

26. The base station of claim 25, wherein, within the first subframe, the first set of symbols is before the second set of symbols.

27. The base station of claim 25, wherein, within the first subframe, the first set of symbols is after the second set of symbols.

28. The base station of claim 24, wherein the PSS and the SSS are transmitted in a first set of symbols of a third subframe of the frame and in a second set of symbols of the third subframe,
wherein, within the first set of symbols of the third subframe and within the second set of symbols of the third subframe, the SSS is transmitted in a symbol that is subsequent to a symbol in which the PSS is transmitted.

29. The base station of claim 24, wherein the PSS and the SSS are transmitted in a third set of symbols of the first subframe or a third set of symbols of the second subframe,
wherein, within the third set of symbols of the first subframe or the third set of symbols of the second subframe, the SSS is transmitted in a symbol that is subsequent to a symbol in which the PSS is transmitted.

30. The base station of claim 24, wherein the first set of symbols of the second subframe includes a third symbol of the second subframe and a fourth symbol of the second subframe.

* * * * *